(12) United States Patent
Chee et al.

(10) Patent No.: US 10,136,295 B1
(45) Date of Patent: Nov. 20, 2018

(54) DEVICE, SYSTEM AND METHOD FOR PUBLIC SAFETY ASSISTANCE DETECTION

(71) Applicant: MOTOROLA SOLUTIONS, INC., Chicago, IL (US)

(72) Inventors: Kong Chin Chee, Bayan Baru (MY); Soon Hoe Lim, Ipoh (MY); Siew Im Low, Indah Jalan Helang (MY); Pei Shi Liew, Cheras (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/798,883

(22) Filed: Oct. 31, 2017

(51) Int. Cl.
  *H04W 4/90* (2018.01)
  *H04M 1/725* (2006.01)
  *H04W 4/02* (2018.01)
  *H04L 29/08* (2006.01)

(52) U.S. Cl.
  CPC ......... *H04W 4/90* (2018.02); *H04M 1/72541* (2013.01); *H04M 1/72572* (2013.01); *H04W 4/023* (2013.01); *H04L 67/025* (2013.01); *H04L 67/10* (2013.01)

(58) Field of Classification Search
  CPC ......... H04W 4/90; H04W 4/22; H04W 4/023; H04M 1/72572; H04M 1/72541; H04L 67/10; H04L 67/025
  See application file for complete search history.

(56) References Cited

U.S. PATENT DOCUMENTS

| | | | |
|---|---|---|---|
| 7,643,822 B2* | 1/2010 | Ling | G06F 17/30979 455/412.2 |
| 9,210,110 B2* | 12/2015 | Maria | H04L 51/066 |
| 9,497,585 B1* | 11/2016 | Cooley | H04W 4/02 |
| 9,686,664 B1* | 6/2017 | Amason | H04W 4/22 |
| 9,717,101 B1* | 7/2017 | Burnham | H04W 4/021 |
| 2002/0140715 A1 | 10/2002 | Smet | |
| 2007/0123235 A1* | 5/2007 | Newport | H04M 3/4931 455/414.2 |
| 2009/0233631 A1* | 9/2009 | Butler, Sr. | G06Q 50/30 455/466 |
| 2014/0134969 A1* | 5/2014 | Jin | H04W 4/90 455/404.1 |
| 2014/0143328 A1* | 5/2014 | Miller | H04W 4/02 709/204 |

(Continued)

*Primary Examiner* — Nathan Mitchell
(74) *Attorney, Agent, or Firm* — Perry + Currier, Inc.

(57) ABSTRACT

A device, system and method for public safety assistance detection is provided. The device comprises a communication interface; a location determining device; an input device; a memory storing keywords; and a controller. The controller implements: an assistance application; and at least one monitored application at which alphanumeric input is received using the input device, each of the assistance application and the at least one monitored application hosted by different respective servers. When the alphanumeric input is received at the at least one monitored application, the controller provides the alphanumeric input to the assistance application. When the alphanumeric input is received at the assistance application includes one or more keywords, the controller transmits, using the interface, at least a portion of the alphanumeric input to a server that hosts the assistance application, as well as a current location determined using the location determining device.

18 Claims, 13 Drawing Sheets

(56) References Cited

U.S. PATENT DOCUMENTS

2014/0308915 A1\* 10/2014 Reitnour ................. H04W 4/90
                                                      455/404.2
2017/0061512 A1    3/2017 Avcil \* cited by examiner

DEVICE, SYSTEM AND METHOD FOR PUBLIC SAFETY ASSISTANCE DETECTION

BACKGROUND OF THE INVENTION

Public safety officers, such as police officers, assigned to patrol a geographic region are generally equipped with mobile devices that are used to provide assistance and/or protect people in the region. However, in some situations, people requiring assistance may not be in a position to directly request assistance, which may lead to an increase in crime, and/or lost people and/or unassisted people in the region, which in turn may lead to an increase in a need for public safety officers and/or public safety resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
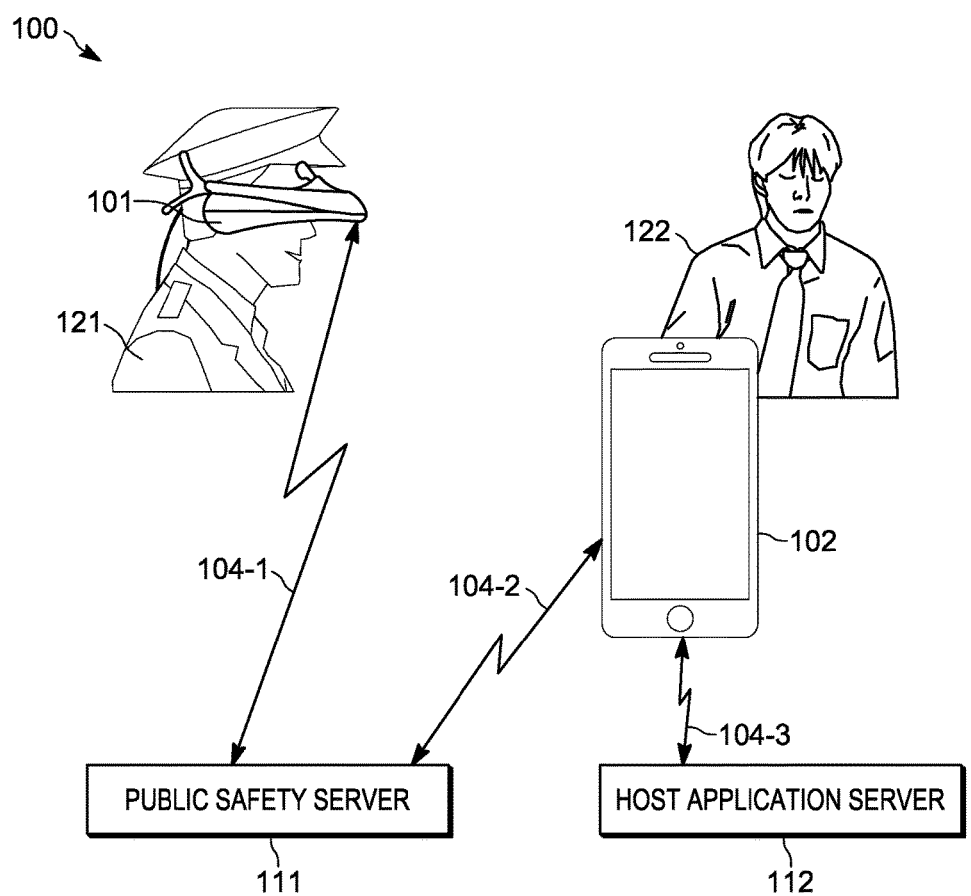
FIG. 1 depicts a system for public safety assistance detection in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a communication interface; a location determining device; an input device; a memory storing keywords; and a controller configured to: implement: an assistance application; and at least one monitored application at which alphanumeric input is received using the input device, each of the assistance application and the at least one monitored application hosted by different respective servers; when the alphanumeric input is received at the at least one monitored application, provide the alphanumeric input to the assistance application; and when the alphanumeric input is received at the assistance application includes one or more of the keywords, transmit, using the communication interface, at least a portion of the alphanumeric input to a server that hosts the assistance application, the at least a portion of the alphanumeric input transmitted with a current location determined using the location determining device.

Another aspect of the specification provides a method comprising: implementing, at controller of a device: an assistance application; and at least one monitored application at which alphanumeric input is received using an input device, each of the assistance application and the at least one monitored application hosted by different respective servers; when the alphanumeric input is received at the at least one monitored application, providing, using the controller, the alphanumeric input to the assistance application; and when the alphanumeric input is received at the assistance application includes one or more keywords stored at a memory, transmitting, using a communication interface of the device, at least a portion of the alphanumeric input to a server that hosts the assistance application, the at least a portion of the alphanumeric input transmitted with a current location determined using a location determining device.

A further aspect of the specification provides a server comprising: a communication interface; and a controller configured to: receive, using the communication interface, a respective location of a responder augmented reality device; receive, using the communication interface, a request for assistance that includes: alphanumeric input and an associated location of a device from which the request was received; convert at least a portion of the request to augmented reality data; and when the respective location of the responder augmented reality device is within a given distance of the associated location of the device from which the request was received, transmit, using the communication interface, the augmented reality data to the responder augmented reality device for display thereupon.

FIG. 1 is a block diagram of a system 100 that includes a responder augmented reality device 101, a communication device 102, a public safety server 111 and a host application server 112. Each of the responder augmented reality device 101 (interchangeably referred to hereafter as the device 101) and the communication device 102 (interchangeably referred to hereafter as the device 102) are in communication with the public safety server 111 via respective links 104-1, 104-2, and the device 102 is in communication with the host application server 112 via a link 104-3. The links 104-1, 104-2, 104-3 will be interchangeably referred to hereafter, collectively, as the links 104 and, generically, as a link 104.

As depicted, the device 101 is being operated by a public safety officer 121 (interchangeably referred to hereafter as the officer 121), for example a police officer, a responder, a first responder, and the like; and the device 102 is being operated by a user 122, for example a member of the public who may require public safety assistance and the like. It is assumed in example embodiments described herein that both the officer 121 and the user 122 are pedestrians; for example, the officer 121 may be a police officer "walking a beat" and the like. However, the officer 121 and/or the user 122 may alternatively be travelling in using vehicles, cars, bicycles, horses and the like.

While the device 101 is depicted as augmented reality glasses being worn by the officer 121, the device 101 generally comprises a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. However, other suitable devices are within the scope of present embodiments. Furthermore, the device 101 may be incorporated into vehicles, and the like (for example emergency service vehicles), as a windshield heads-up display device (including radio, an emergency radio), and the like.

Indeed, any device that adapted for augmented reality functionality is within the scope of present implementations.

In some embodiments, the device 101 is specifically adapted for emergency service radio functionality, and the like, used by emergency responders and/or emergency responders, including, but not limited to, police service responders, fire service responders, emergency medical service responders, and the like. In some of these embodiments, the device 101 further includes other types of hardware for emergency service radio functionality, including, but not limited to, push-to-talk ("PTT") functionality. Indeed, the device 101 may be configured to wirelessly communicate over communication channels which may include, but are not limited to, one or more of wireless channels, cell-phone channels, cellular network channels, packet-based channels, analog network channels, Voice-Over-Internet ("VoIP"), push-to-talk channels and the like, and/or a combination. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

The device 102 generally comprises a mobile device which includes, but is not limited to, any suitable combination of electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. The device 102 may further be adapted for use as a consumer device and/or business device, and the like, and/or may include additional or alternative components related to, for example, telephony, messaging, entertainment, and/or any other components that may be used with computing devices and/or communication devices.

The server 111 generally comprises a server-adapted computing device, computing device and/or a communication device which may be used to communicate with a plurality of devices, similar to the device 101, and the server 111 may be used for dispatching officers and/or responders, for example to dispatch officers and/or first responders operating such devices. For example, the server 111 may be associated with, and/or operated by, one or more entities that deploy and/or manage officers and/or first responders, for example, a police services entity (e.g. a police department), a fire services entity (e.g. a fire department), a paramedical services entity (e.g. a hospital and/or an ambulance services entity), and the like. ace, and optionally a display device and at least one input device. The server 111 is further adapted to communicate with communication devices such as the device 102.

The server 112 generally comprises a host application server configured to host an application at the device 102; in general, the server 112 may include, but is not limited to, one or more of a browser application server, search server, a messaging server, a telephone server, and the like.

Figure 2:
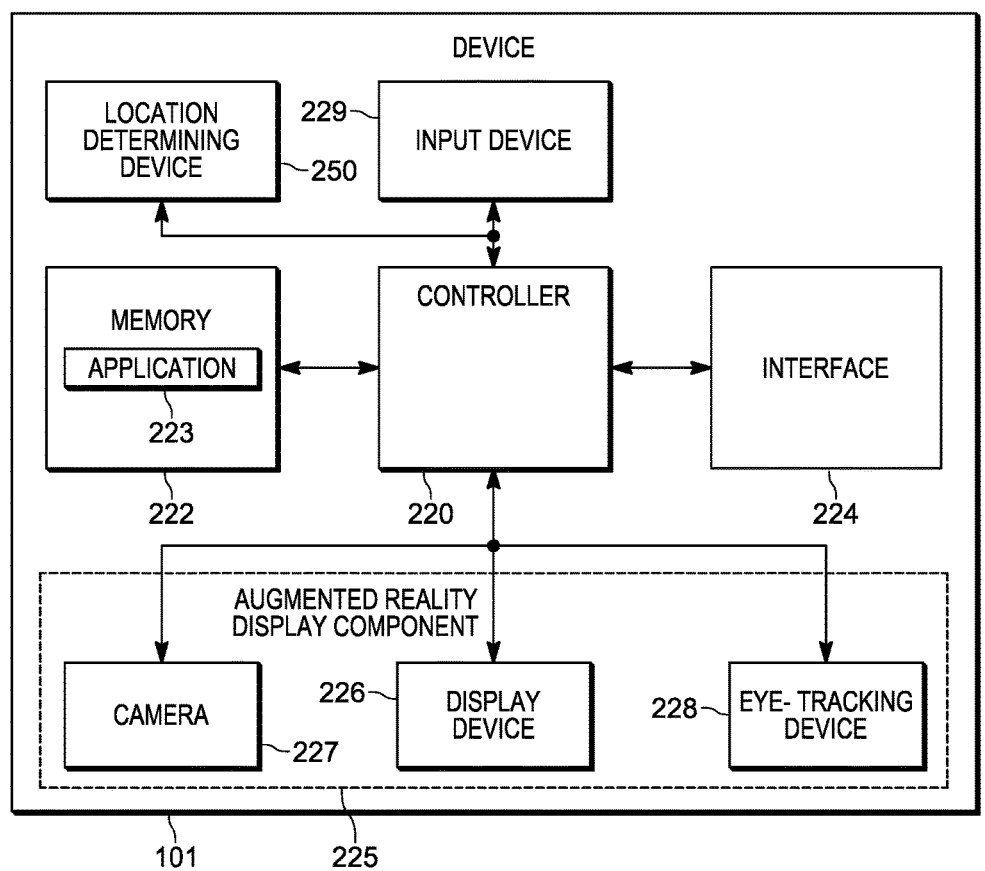
FIG. 2 depicts a block diagram of a responder augmented reality device configured to automatically provide public safety assistance detection in accordance with some embodiments.

Attention is next directed to FIG. 2, which depicts a block diagram of the device 101, the device 101 comprising: a controller 220; a memory 222 storing an application 223; a communication interface 224 (interchangeably referred to as the interface 224); an augmented reality component 225 including a camera 227, a display device 226, a camera 227 and an optional eye-tracking device 228; at least one input device 229; and a location determining device 250.

The controller 220 is generally in communication with the memory 222, and the interface 224, the display device 226, the camera 227, and the eye-tracking device 228 (when present) of the responder augmented reality device 101, the input device 229, and the location determining device 250.

The controller 220 includes one or more logic circuits, one or more processors, one or more microprocessors, one or more ASIC (application-specific integrated circuits) and one or more FPGA (field-programmable gate arrays). In some embodiments, the controller 220 and/or the device 101 is not a generic controller and/or a generic device, but a device specifically configured to implement hierarchical public assistance detection functionality. For example, in some embodiments, the device 101 and/or the controller 220 specifically comprises a computer executable engine configured to implement specific functionality for public assistance detection functionality.

The memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). Programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

In particular, the memory 222 of FIG. 2 stores instructions corresponding to the application 223 that, when executed by the controller 220, enables the controller 220 to implement the public assistance detection functionality associated with the application 223. In the illustrated example, when the controller 220 executes the application 223, the controller 220 is enabled to: transmit, to the server 111, using the communication interface 224, a location of the device 101 as determined using the location determining device 250; receive, from the server 111, using the communication interface 224, augmented reality data, using the communication interface, to be provided by the augmented reality component 225, the augmented reality data including: a respective location of an assistance requesting device (e.g. the device 102), the assistance requesting device being within a given distance of the device 101; and alphanumeric input received at the assistance requesting device; and provide; at the display device, according to the respective location of the assistance requesting device, at least a portion of the alphanumeric input.

The interface 224 is generally configured to wirelessly communicate with the server 111, and the link 104-1 may include, but is not limited to any suitable combination of wireless and wireless communication links, and/or any suitable combination of wired networks and/or wireless networks.

In some embodiments, the interface 224 may be implemented by, for example, one or more radios and/or connectors and/or network adaptors, configured to communicate wirelessly, with network architecture that is used to implement the link 104-1 and/or communication channels over the link 104-1. The interface 224 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 224 includes one or more local area network or personal area network transceivers operating in accordance with an IEEE 902.11 standard (e.g., 902.11a, 902.11b, 902.11g), and/or a Bluetooth™ transceiver which may be used to communicate with the server 111. In some embodiments, the interface 224 is further configured to communicate "radio-to-radio" on some communication channels (e.g. in embodiments where the interface 224 includes a radio), while other communication channels are configured to use wireless network infrastructure.

The augmented reality component 225 generally comprises the display device 226, the camera 227 and, optionally, the eye-tracking device 228. With brief reference back to FIG. 1, the device 101 is configured to be worn by a user, such as the officer 121, and hence the device 101 is generally configured as a wearable device. In these embodiments, the display device 226 comprises a heads-up display device and the like. As such, the device 101 further comprises a housing which is wearable by the officer 121, for example in a manner similar to glasses and the like.

In particular, the camera 227 is mounted on the device 101 in a forward-facing direction (e.g. away from the officer 121) such that images acquired by the camera 227 generally correspond to a direction in which the officer 121 is looking with their eyes. In particular, as depicted in FIG. 1, the officer 121 is looking towards a location of the user 122.

Furthermore, it is understood that the display device 226 of the device 101 is generally mounted such that the display device 226 is viewable by the officer 121, and that images acquired by the camera 227, and/or augmented images, may be provided and/or rendered and/or displayed at the display device 226 such that the officer 121 may view the environment in a forward-facing direction using the display device 226 in an augmented fashion.

The optional eye-tracking device 228 is generally mounted in a direction opposite to that of the camera 227 such that the eye-tracking device 228 is facing in a direction of the eyes of the officer 121. As such the optional eye-tracking device 228 may determine an eye-gaze direction of the officer 121 and the images acquired by the camera 227 may be used to augment images provided at the display device 226 depending on the eye-gaze direction. Put another way, the eye-tracking device 228 may be used by the controller 220 to determine an eye-gaze direction of the officer 121, and the images acquired by the camera 227 may be used to augment objects in the eye-gaze direction at the display device 226.

Returning to FIG. 2, the camera 227 generally comprises one or more camera devices and/or video devices configured to acquire electronic images, including, but not limited to, a charge-coupled device (CCD) camera, and the like.

Similarly, the eye-tracking device 228 comprises one or more sensors configured to determine an eye-gaze direction including, but not limited to, one or more cameras arranged to acquire images of eyes of a user (e.g. the officer 121) using the device 101. The eye-tracking device 228 may further include one or more lights for illuminating the eyes of the user, including, but not limited to, light visible to the user and lights not visible to the user, such as infrared lights. In general, the one or more sensors configured to determine an eye-gaze direction are sensitive to light provided by the more lights for illuminating the eyes (when present).

The display device 226 comprises one or more display devices, for example, one display device for each eye of a user, or one display device viewable by both eyes of a user. Either way, the display device 226 comprises one or more of a cathode ray tube, a flat panel display, a liquid crystal display, an organic light emitting display, and the like.

In some embodiments, the display device 226 is generally transparent such that the officer 121 may view the environment in a forward-facing direction through the display device 226, with a field-of-view of the camera 227 corresponding to the field-of-view of the officer 121 through the display device 226, with the environment viewed through the display device 226 augmented using the display device 226 by augmented reality data received from the server 111. In such embodiments, the camera 227 may be optional.

Alternatively, the display device 226 is generally not transparent such that the officer 121 may view the environment in a forward-facing direction using images acquired by the camera 227 which are provided at the display device 226, the images augmented by augmented reality data received from the server 111. Indeed, in these embodiments, the device 101 may not be wearable but rather the device 101 may comprise a (e.g. non-wearable) mobile communication device configured for augmented reality functionality.

The input device 229 may comprises any combination of one or more input devices configured to receive input to control, for example, the display device 226, the interface 224, and the like. The input device 229 may include a touch panel, a pointing device, a virtual keyboard (e.g. provided at the display device) and the like.

In yet further embodiments, the device 101 may be in communication (e.g. via the interface 224) with a communication device (not depicted) being used by the officer 121, for example as part of a personal area network (PAN). In these embodiments, the communication device in the personal area network may be used to receive input which is conveyed to the device 101, and the input device 229 may be optional. Indeed, in such embodiments, the communication device may assume other functions of the device 101 as described including, but not limited to, location determination functionality, server communication functionality, and the like.

The location determining device 250 includes any device configured to determine a location of the device 101, including, but not limited to, one or more of a GPS device, a GLONASS device, a Galileo device, a Beidou device, a triangulation device, and the like. The device 101 may periodically determine its respective location using the location determining device 250 and transmit the respective location to the server 111.

Furthermore, while not depicted, it is assumed that device 101 includes a power source, including, but not limited to, a battery, a power pack, and the like.

It should be understood that a wide variety of configurations for the device 101 are within the scope of present embodiments.

Figure 3:
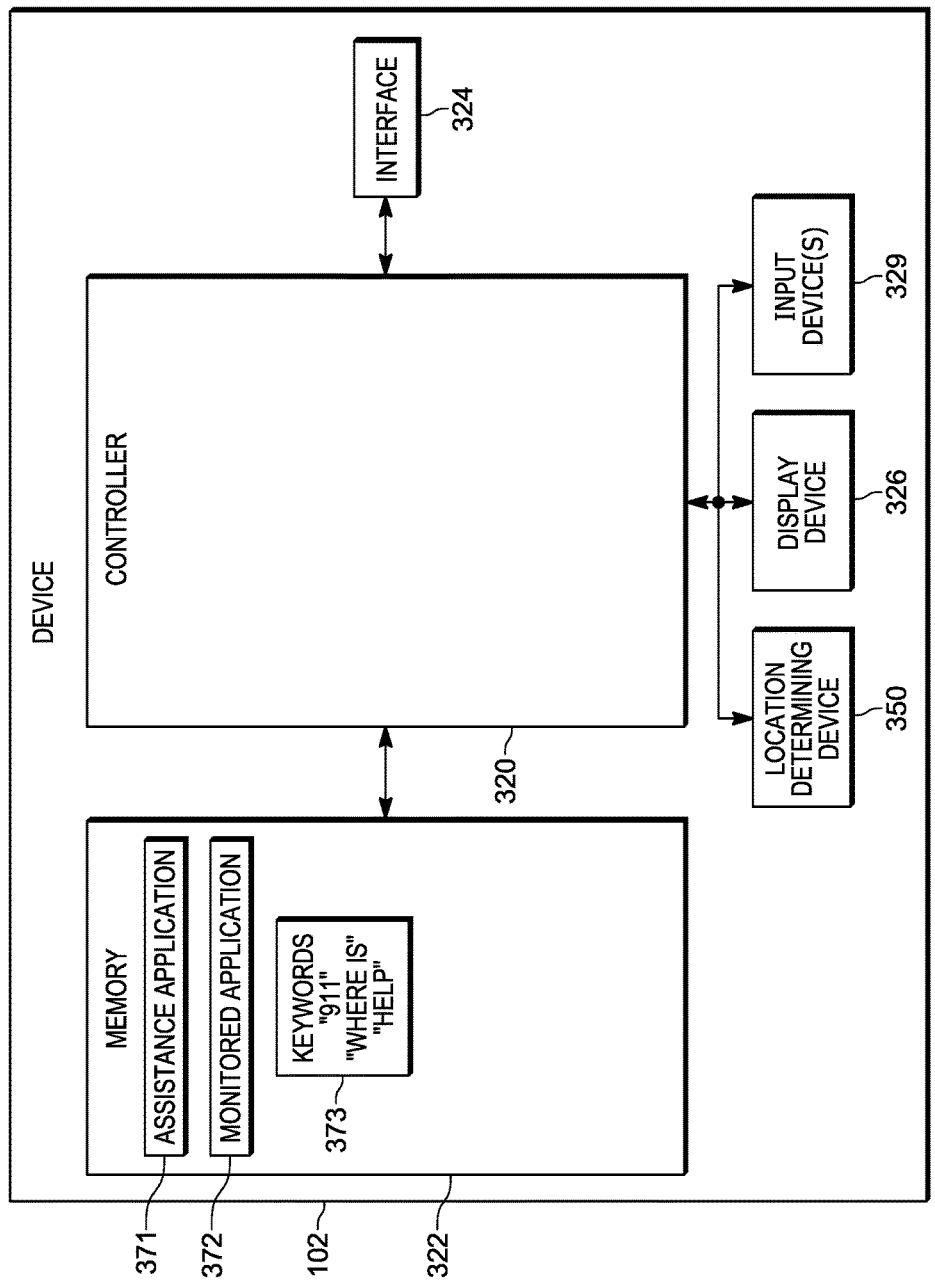
FIG. 3 depicts a block diagram of a communication device configured to automatically request public safety assistance in accordance with some embodiments.

Attention is next directed to FIG. 3, which depicts a block diagram of the device 102, the device 102 comprising: a controller 320; a memory 322; a communication interface 324 (interchangeably referred to as the interface 324); a display device 326; at least one input device 329; and a location determining device 350.

The controller 320 is generally in communication with the memory 322, and the interface 324, the display device 326, the input device 329, and the location determining device 350.

In general, the controller 320, the memory 322, the interface 324, the display device 326, the input device 329 and the location determining device 350 are respectively similar to the controller 220, the memory 222, the interface 224, the display device 226, the input device 229 and the location determining device 250 of the device 101, but adapted for the physical footprint and/or functionality of the device 101. For example, the interface 324 may not be configured to communicate using public safety communications and/or public safety standards.

In particular, however, the interface 324 is configured to communicate with both the server 111 and the server 112, via respective links 104-2, 104-3, at least a portion of which may be wireless.

Furthermore, the memory 322 stores at least two applications: an assistance application 371 and at least one monitored application 372. In general, the assistance application 371 is configured to monitor the at least one monitored application 372 based, for example, on keywords 373 also stored at the memory 322.

As depicted, the keywords 373 include words related to assistance such as "911", "Where is", "Help", however any keywords related to assistance are within the scope of present embodiments. While the keywords 373 are depicted as being separate from the assistance application 371, the keywords 373 may comprise a component of the assistance application 371.

Furthermore, the assistance application 371 may be provisioned at the device 102, for example using an application website, an application "store" and the like, such that the user 122 voluntary causes the assistance application 371 to be installed at the device 102. Indeed, installation of the assistance application 371 may include the user 122 consenting to such installation. However, in some embodiments, the controller 320 may be configured to turn the assistance application 371 on and off, after installation, for example based on input received at the input device 329 such that the user 122 may decide when assistance is to be automatically requested via the assistance application 371.

The keywords 373 may be provisioned at the device 102 when the assistance application 371 is provisioned at the device 102 and/or updated, for example by an entity associated with the assistance application 371, for example in an application update, and the like. In some embodiments, the entity associated with the assistance application 371 may be the entity associated with the public safety server 111. Indeed, in general, the assistance application 371, when executed by the controller 320, causes the controller 320 to automatically transmit alphanumeric input received at the at least one monitored application 372, using the input device 329, to the server 111 to provide public safety assistance functionality.

As such, the server 111 may be referred to as hosting the assistance application 371. In other words, the controller 320 is preconfigured to communicate with the public safety server 111 via the assistance application 371, and the server 111 is generally configured to process alphanumeric input received from the assistance application 371. In particular, the assistance application 371 may include a network address of the server 111, and the assistance application 371 may automatically format alphanumeric input received at the at least one monitored application 372 for use by the server 111.

The at least one monitored application 372 may comprise one or more of a search application, a browser application, a messaging application, a telephone application and the like. Indeed, in some embodiments, applications to be monitored by the assistance application 371 may be selected at the device 102 and/or configured at the assistance application 371. In general, alphanumeric input received at the at least one monitored application 372 may be transmitted to the host application server 112 for processing, and the like. For example, when the at least one monitored application 372 comprises a search application, the server 112 may comprise a search server which searches the alphanumeric input received at the at least one monitored application 372 (e.g. when the alphanumeric input is transmitted to the server 112). Similarly, when the at least one monitored application 372 comprises a browser application, the server 112 may comprise a server for supporting the browser application, which searches and/or returns data associated with the alphanumeric input received at the at least one monitored application 372. Similarly, when the at least one monitored application 372 comprises a messaging application, the server 112 may comprise a messaging server which transmits messages that may include the alphanumeric input received at the at least one monitored application 372. Similarly, when the at least one monitored application 372 comprises a telephone application, the server 112 may comprise a telephone server which initiates calls which may be based on the alphanumeric input received at the at least one monitored application 372, including, but not limited to, 911 and/or emergency calls.

Hence, the host application server 112 may be referred to as hosting the at least one monitored application 372.

The controller 320 includes one or more logic circuits, one or more processors, one or more microprocessors, one or more ASIC (application-specific integrated circuits) and one or more FPGA (field-programmable gate arrays). In some embodiments, the controller 320 and/or the device 101 is not a generic controller and/or a generic device, but a device specifically configured to implement hierarchical public assistance detection functionality. For example, in some embodiments, the device 102 and/or the controller 320 specifically comprises a computer executable engine configured to implement specific functionality for public assistance detection functionality.

The memory 322 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). Programming instructions (e.g., machine readable instructions) that implement the functional teachings of the device 101 as described herein are maintained, persistently, at the memory 322 and used by the controller 320 which makes appropriate utilization of volatile storage during the execution of such programming instructions.

In particular, the memory 322 of FIG. 2 stores instructions corresponding to the assistance application 371 that, when executed by the controller 320, enables the controller 320 to implement the public assistance detection functionality associated with the assistance application 371. In the illustrated example, when the controller 320 executes the assistance application 371, the controller 320 is enabled to: implement: the assistance application 371; and the at least one monitored application 372 at which alphanumeric input is received using the input device 329, each of the assistance application 371 and the at least one monitored application 372 hosted by different respective servers; when the alphanumeric input is received at the at least one monitored application 372, provide the alphanumeric input to the assistance application 371; and when the alphanumeric input is received at the assistance application 371 includes one or more of the keywords 373, transmit, using the communication interface 324, at least a portion of the alphanumeric input to the server 111 that hosts the assistance application 371, the at least a portion of the alphanumeric input transmitted with a current location determined using the location determining device 350. For example, the at least a portion of the alphanumeric input transmitted with a current location can comprise a request for assistance transmitted to the server 111.

While not depicted, the device 102 may include additional or alternative components related to, for example, telephony, messaging, entertainment, and/or any other components that may be used with computing devices and/or communication devices; such components may include one or more speakers, one or microphones, and the like.

Furthermore, while not depicted, it is assumed that device 102 includes a power source, including, but not limited to, a battery, a power pack, and the like.

It should be understood that a wide variety of configurations for the device 101 are within the scope of present embodiments.

Figure 4:
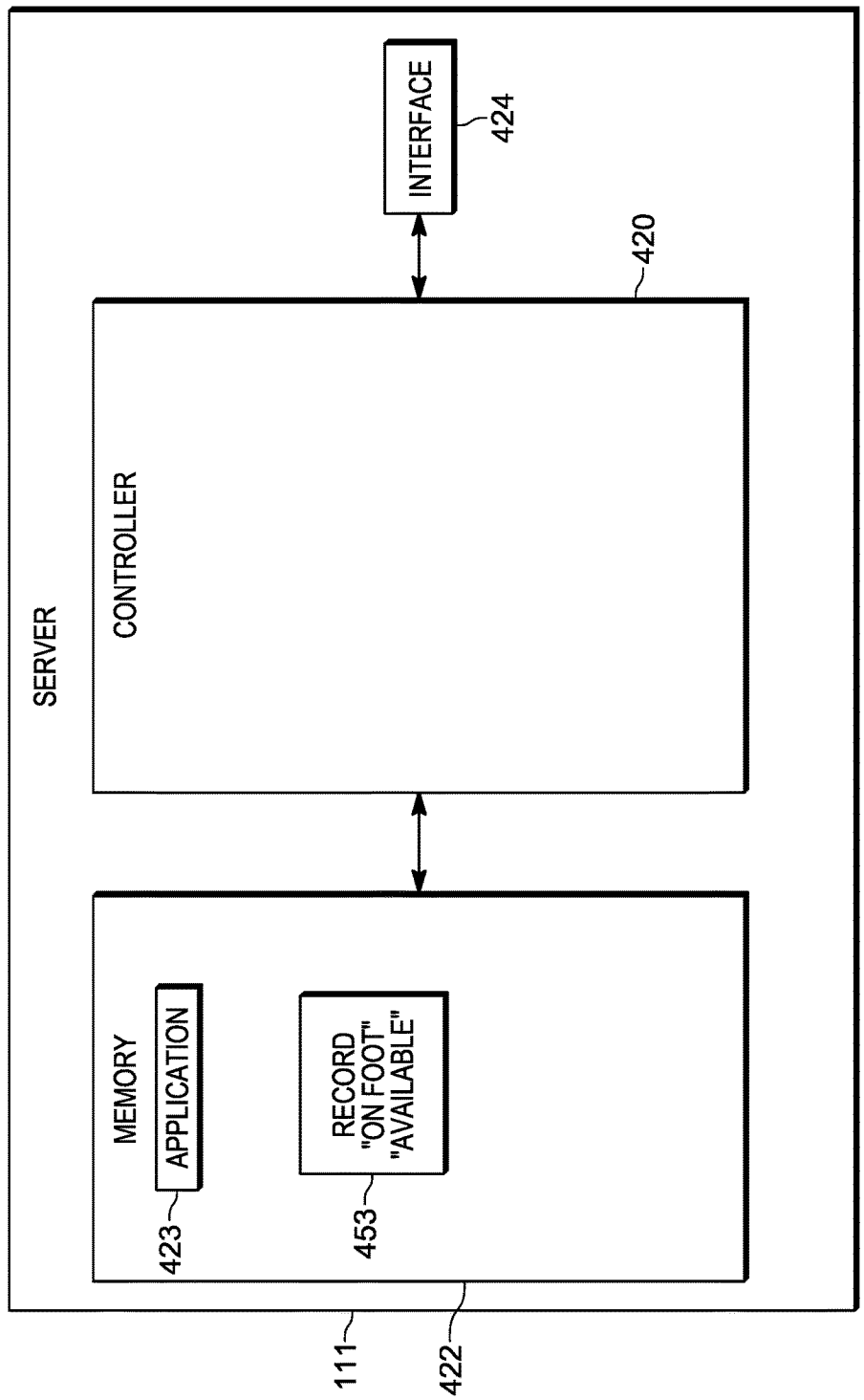
FIG. 4 depicts a block diagram of a public safety server configured to automatically provide public safety assistance detection in accordance with some embodiments.

Attention is next directed to FIG. 4, which depicts a block diagram of the server 111, the server 111 comprising: a controller 420; a memory 422; and a communication interface 424 (interchangeably referred to as the interface 424). While not depicted, the server 111 may optionally comprise a display device, at least one input device and/or any other components related to server functionality.

The controller 420 is generally in communication with the memory 422, and the interface 424.

In general, the controller 420, the memory 422, and the interface 424, are respectively similar to the controller 220, the memory 222, and the interface 224, of the device 101, but adapted for the physical footprint and/or functionality of the server 111. Furthermore, the interface 424 is generally configured to communicate with both the devices 101, 102 via the links 104-1, 104-2.

The controller 420 includes one or more logic circuits, one or more processors, one or more microprocessors, one or more ASIC (application-specific integrated circuits) and one or more FPGA (field-programmable gate arrays). In some embodiments, the controller 420 and/or the server 111 is not a generic controller and/or a generic server, but a device specifically configured to implement hierarchical public assistance detection functionality. For example, in some embodiments, the server 111 and/or the controller 420 specifically comprises a computer executable engine configured to implement specific functionality for public assistance detection functionality.

The memory 422 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). Programming instructions (e.g., machine readable instructions) that implement the functional teachings of the server 111 as described herein are maintained, persistently, at the memory 422 and used by the controller 420 which makes appropriate utilization of volatile storage during the execution of such programming instructions.

In particular, the memory 422 of FIG. 2 stores instructions corresponding to the application 423 that, when executed by the controller 420, enables the controller 420 to implement the public assistance detection functionality associated with the application 423. In the illustrated example, when the controller 420 executes the application 423, the controller 420 is enabled to: receive, using the communication interface 424, a respective location of a responder augmented reality device 101; receive, using the communication interface 424, a request for assistance that includes: alphanumeric input and an associated location of a device 102 from which the request was received; convert at least a portion of the request to augmented reality data; and when the respective location of the responder augmented reality device 101 is within a given distance of the associated location of the device 102 from which the request was received, transmit, using the communication interface 424, the augmented reality data to the responder augmented reality device 101 for display thereupon.

In general, the server 111 hosts the assistance application 371 at the device 102 as, the request for assistance received at the server 111 is generally initiated via the assistance application 371. Furthermore, the server 111 generally provides the augmented reality data to the device 101 in response to receiving the request for assistance.

As depicted, the memory 422 further stores an optional record 453 associated with the device 101. As depicted, the record 453 may include, for example, a mode of transportation associated with the device 101 and a status of the device 101. The record 453 may further include an identifier (not depicted) of the device 101 and/or the officer 121.

In the depicted example, the mode of transportation of the device 101 is stored as the text "On Foot", indicating that the officer 121 carrying the device 101 is on foot and/or a pedestrian. However, the mode of transportation of the device 101 may alternatively include, but is not limited, to a vehicle, a bicycle, a horse, and the like.

In the depicted example, record 453 includes the status of the device 101 as "Available" indicating that the officer 121 operating the device 101 is available to provide assistance and/or to be dispatched. The status of the device 101 (and/or the officer 121) may be updated based on a status received from the device 101 as described in more detail below; for example, the status of the device 101 may change between "Available" and "Unavailable".

The record 453 may be stored at the memory 422 as an employee record, and the like and updated depending on the mode of transportation of the device 101 and/or the officer 121 and/or a status of the device 101 and/or the officer 121, for example during a shift. While not depicted, the record 453 may be one of a plurality of records, for example one record for each officer associated with the entity operating the server 111. The records 453 may further include a location of the device 101.

While not depicted, it is assumed that server 111 includes a power source, including, but not limited to, a connection to a mains power supply, and the like.

It should be understood that a wide variety of configurations for the server 111 are within the scope of present embodiments.

While details of the server 112 are not described herein, the server 112 may generally be similar to the server 111, however the components of the server 112 are adapted for the functionality of the server 112 (e.g. searching, browsing, messaging, telephoning, etc.).

Figure 5:
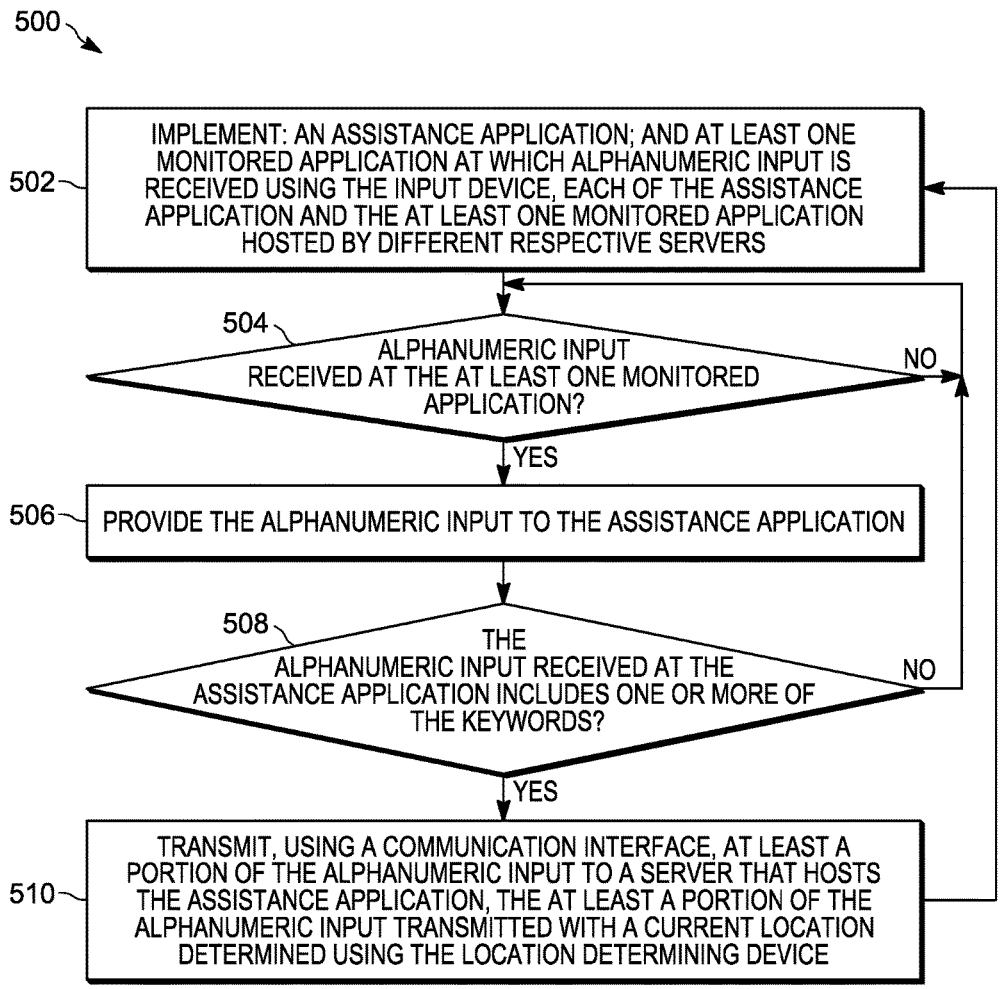
FIG. 5 is a flowchart of a method for public safety assistance detection as implemented at a communication device in accordance with some embodiments.

Attention is now directed to FIG. 5 which depicts a flowchart representative of a method 500 for public safety assistance detection. In some embodiments, the operations of the method 500 of FIG. 5 correspond to machine readable instructions that are executed by, for example, the device 102 of FIG. 3, and specifically by the controller 320 of the device 102. In the illustrated example, the instructions represented by the blocks of FIG. 5 are stored at the memory 322, for example, as the assistance application 371. The method 500 of FIG. 1 is one way in which the device 102 and/or the controller 320 and/or the system 100 is configured. Furthermore, the following discussion of the method 500 of FIG. 5 will lead to a further understanding of the system 100 and the device 102, and its various components.

However, it is to be understood that the device 102 and/or the controller 320 and/or the method 500 and/or the system 100 may be varied, and need not work exactly as discussed herein in conjunction with each other, and that such variations are within the scope of present embodiments.

Furthermore, the method 500 of FIG. 5 need not be performed in the exact sequence as shown and likewise various blocks may be performed in parallel rather than in sequence. Accordingly, the elements of method 500 are referred to herein as "blocks" rather than "steps".

At a block 502, the controller 320 implements: the assistance application 371; and the at least one monitored application 372 at which alphanumeric input is received using the input device 329, each of the assistance application 371 and the at least one monitored application 372 hosted by different respective servers.

At a block 504, the controller 320 determines when the alphanumeric input is received at the at least one monitored application 372.

When no alphanumeric input is received at the at least one monitored application 372 (e.g. a "NO" decision at the block 504), the controller 320 repeats the block 504 until alphanumeric input is received at the at least one monitored application 372, and/or the assistance application 371 is closed and/or ended.

When the alphanumeric input is received at the at least one monitored application 372 (e.g. a "YES" decision at the block 504), at a block 506, the controller 320 provides the alphanumeric input to the assistance application 371.

At a block 508 the controller 320 determines when the alphanumeric input is received at the assistance application 371 includes one or more of the keywords 373.

When the alphanumeric input is received at the assistance application 371 does not includes one or more of the keywords 373 (e.g. a "NO" decision at the block 508) the controller 320 repeats the block 504 until alphanumeric input is again received at the at least one monitored application 372, and/or the assistance application 371 is closed and/or ended.

When the alphanumeric input is received at the assistance application 371 includes one or more of the keywords 373 (e.g. a "YES" decision at the block 508), at a block 510, the controller 320 transmits, using the communication interface 324, at least a portion of the alphanumeric input to the server 111 that hosts the assistance application 371, the at least a portion of the alphanumeric input transmitted with a current location determined using the location determining device 350.

Figure 6:
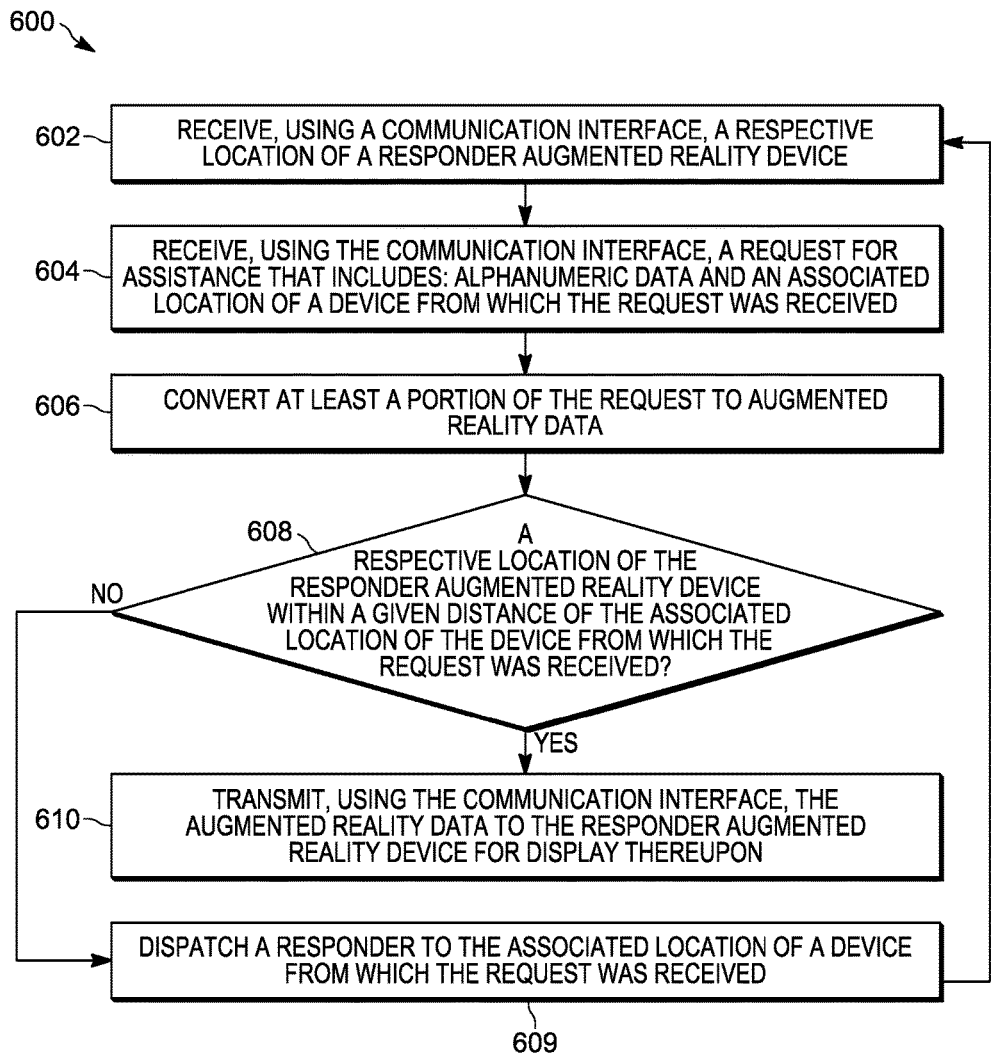
FIG. 6 is a flowchart of a method for public safety assistance detection as implemented at a server in accordance with some embodiments.

Attention is now directed to FIG. 6 which depicts a flowchart representative of a method 600 for public safety assistance detection. In some embodiments, the operations of the method 600 of FIG. 6 correspond to machine readable instructions that are executed by, for example, the server 111 of FIG. 3, and specifically by the controller 420 of the server 111. In the illustrated example, the instructions represented by the blocks of FIG. 6 are stored at the memory 422, for example, as the application 423. The method 600 of FIG. 1 is one way in which the server 111 and/or the controller 420 and/or the system 100 is configured. Furthermore, the following discussion of the method 600 of FIG. 6 will lead to a further understanding of the system 100 and the server 111, and its various components.

However, it is to be understood that the server 111 and/or the controller 420 and/or the method 600 and/or the system 100 may be varied, and need not work exactly as discussed herein in conjunction with each other, and that such variations are within the scope of present embodiments.

Furthermore, the method 600 of FIG. 6 need not be performed in the exact sequence as shown and likewise various blocks may be performed in parallel rather than in sequence. Accordingly, the elements of method 600 are referred to herein as "blocks" rather than "steps".

At a block 602, the controller 420 receives, using the communication interface 424, a respective location of a responder augmented reality device 101.

At a block 604, the controller 420 receives, using the communication interface 424, a request for assistance that includes: alphanumeric input and an associated location of a device 102 from which the request was received; convert at least a portion of the request to augmented reality data.

At a block 606 the controller 420 determines when the respective location of the responder augmented reality device 101 is within a given distance of the associated location of the device 102 from which the request was received.

When the respective location of the responder augmented reality device 101 is not within a given distance of the associated location of the device 102 from which the request was received (e.g. a "NO" decision at the block 606), the controller 420 again implements the block 602 and/or waits for a further request for assistance at the block 604. The controller 420 may optionally, at a block 609, dispatch a responder to the associated location of the device 102 from which the request was received, for example as based on keywords in the request for assistance. For example, if the request for assistance contains keywords associated with an urgent request for assistance, such as "911", "Help", "Assault", and the like, the controller 420, at the block 609, may transmit a dispatch command to the device 101 and/or other devices associated with responders and/or officers in a geographic region around of the device 102 (that may be greater than the given distance of the block 608) to provide urgent and/or emergency assistance to the user 122 of the device 102.

When the respective location of the responder augmented reality device 101 is within a given distance of the associated location of the device 102 from which the request was received (e.g. a "YES" decision at the block 606), at a block 610, the controller 420 transmits, using the communication interface 424, the augmented reality data to the responder augmented reality device 101 for display thereupon.

Example embodiments of the method 500 and the method 600 will now be described with respect to FIG. 7 to FIG. 13.

Figure 7:
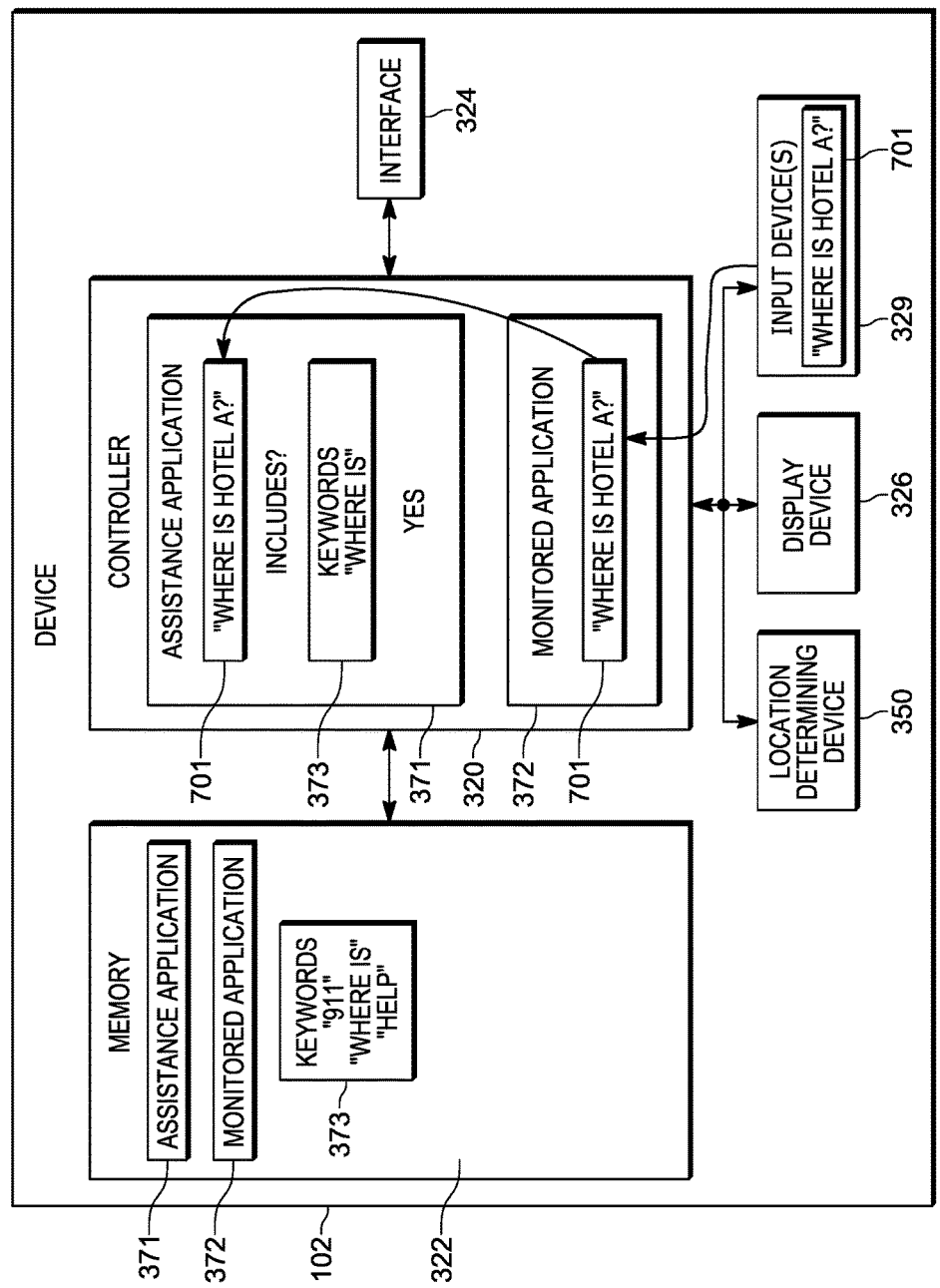
FIG. 7 depicts alphanumeric input being received at the communication device of FIG. 3 in accordance with some embodiments.

Attention is first directed to FIG. 7, which is substantially similar to FIG. 3, with like elements having like numbers. At FIG. 7, the controller 320 of the device 102 is implementing (e.g. at the block 502 of the method 500) the assistance application 371 and the at least one monitored application 372; as depicted, the at least one monitored application 372 comprises a search application. Furthermore, in FIG. 7, alphanumeric input 701 is being received at the input device 329, for example in the form of keystrokes from the input device 329 and the like, being entered into a field, and the like of the at least one monitored application 372 (e.g. a field in which words, and the like, to be searched are to be entered). For example, as depicted, it is assumed that the user 122 has entered a search for "Where is Hotel A" into a search field, and the like, of the at least one monitored application 372 and hence the user 122 requires assistance in finding "Hotel A". Hence, the user 122 may, for example, be searching for a hotel, a restaurant, a tourist location, and the like.

In other words, in some embodiments, the alphanumeric input 701 includes a location. However, in other embodiments, the alphanumeric input 701 may include data indicative of an emergency, such as "911", "Help" and the like.

Furthermore, while the example embodiment of FIG. 7 is described with reference to the at least one monitored application 372 comprising a search application, in other embodiments, the alphanumeric input 701 may be received at a messaging and/or a telephone application. For example, data indicative of an emergency in the alphanumeric input 701 may comprise "911" being entered as keystrokes at the input device 329 in a telephone application.

Returning to the example embodiment of FIG. 7, the controller 320 has determined (e.g. a "YES" decision at the block 504 of the method 500) that the alphanumeric input 701 is being received at the at least one monitored application 372 and (e.g. at the block 506 of the method 500) hence the controller 320 provides the alphanumeric input 701 to the assistance application 371. Indeed, in some embodiments, all alphanumeric input 701 received at the at least one monitored application 372 is provided to the assistance application 371.

As further depicted in FIG. 7, the controller 320 determines (e.g. at the assistance application 371) that the alphanumeric input 701 includes one or more of the keywords 373 (e.g. a "YES" decision at the block 508 of the method 500). In particular, the alphanumeric input 701 includes the keywords "Where is", and hence the controller 320 determines that "YES", the alphanumeric input 701 includes one or more of the keywords 373.

Figure 8:
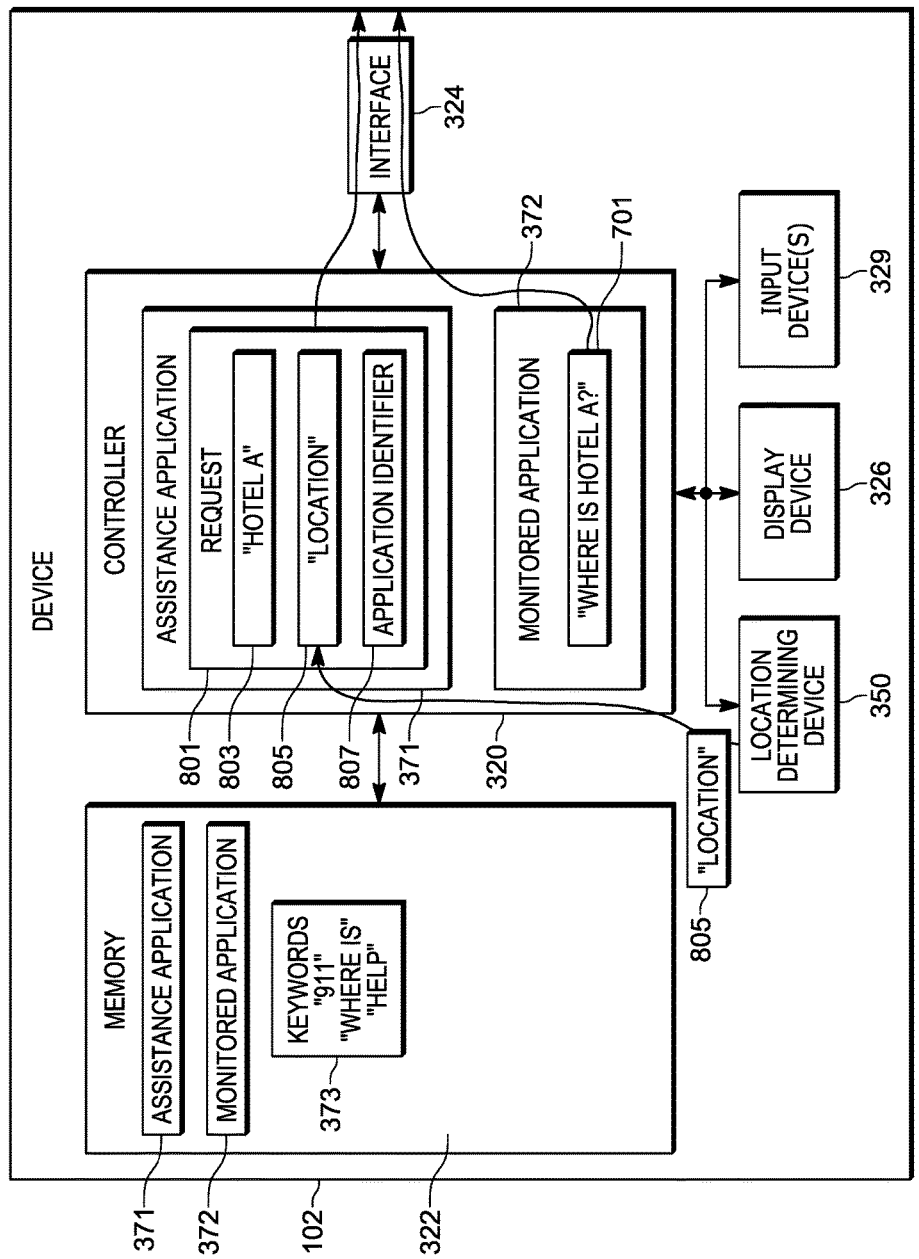
FIG. 8 depicts the communication device of FIG. 2 assembling a request for assistance when the alphanumeric input includes one or more keywords in accordance with some embodiments.

Attention is next directed to FIG. 8, which is substantially similar to FIG. 7, with like elements having like numbers, the example embodiment in FIG. 8 following the example embodiment of FIG. 7. In FIG. 8, as the alphanumeric input 701 includes one or more of the keywords 373, the controller 320 assembles a request 801 for assistance which includes: at least a portion 803 of the alphanumeric input 701; a current location 805 of the device 102, as determined using the location determining device 350; and, optionally, an application identifier 807 of the at least one monitored application 372.

As depicted, the at least a portion 803 of the alphanumeric input 701 comprises the text (and the like) that follows the keywords 373 "Where is" in the alphanumeric input 701. In other words, as depicted, the controller 320 is configured to remove the keywords 373 "Where is" from the alphanumeric input 701 and include, in the request 801, the portion 803. Indeed, the controller 320 and/or the assistance application 371 may be configured to determine the portion 803 based on the keywords 373. For example, when the keywords 373 in the alphanumeric input 701 include alphanumeric input indicative of a search for a location, only the location portion of the alphanumeric input 701 may be included in the request 801 (e.g. without the keywords 373 in the alphanumeric input 701).

However, when the keywords 373 in the alphanumeric input 701 include data indicative of an emergency, such as "911", the data indicative of an emergency may be included in the request 801. For example, when the alphanumeric input 701 includes "911", "Help" and the like, the request 801 may include "911", "Help" and the like.

Hence, the assistance application 371 may include rules, and the like, associated with specific keywords 373, such rules indicative of the portion 803 of the alphanumeric input 701 to be included in the request 801, as based on the keywords 373 in the of the alphanumeric input 701.

The current location 805 may comprise coordinates indicative of a current location of the device 102, for example, GPS coordinates, and the like.

The application identifier 807 may include a name of the at least one monitored application 372, for example name of a search application, and the like, and/or an icon and/or an image that identifies the at least one monitored application 372. However, the application identifier 807 is optional. The application identifier 807 may generally be provided as metadata associated with the at least one monitored application 372.

Figure 9:
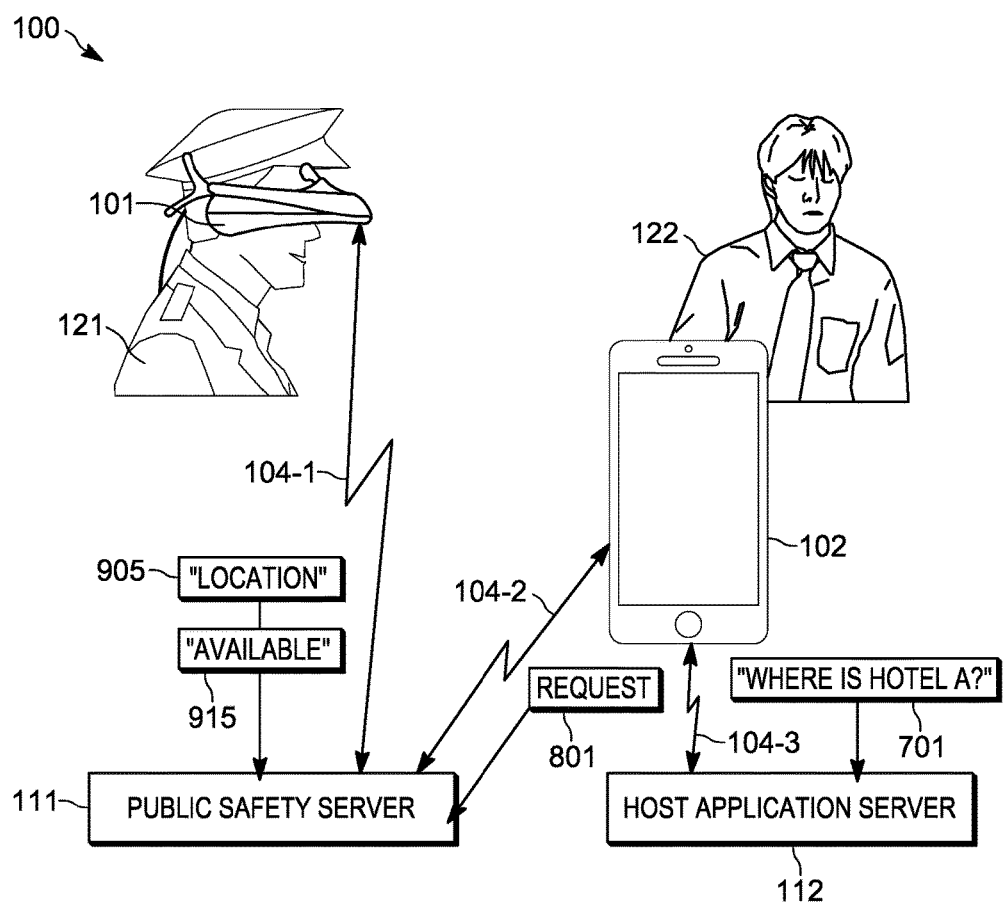
FIG. 9 depicts the communication device automatically transmitting a request for assistance to a public safety server when the alphanumeric input includes one or more keywords in accordance with some embodiments.

With reference to both FIG. 8 and FIG. 9 (which is substantially similar to FIG. 1, with like elements having like numbers), the controller 320 (e.g. at the block 510 of the method 500) transmits, using the communication interface 324, the at least a portion 803 of the alphanumeric input 701 to the server 111 that hosts the assistance application 371, the at least a portion 803 of the alphanumeric input 701 transmitted with the current location 805 determined using the location determining device 350. As depicted, the controller 320 transmits the at least a portion 803 of the alphanumeric input 701 and the current location 805 to the server 111 in the form of the request 801.

Hence, as depicted in the example embodiment of FIG. 7, FIG. 8 and FIG. 9, the at least a portion 803 of the alphanumeric input 701 transmitted to the server 111 includes one or more of a location name and data indicative of an emergency.

Furthermore, in the example embodiment, the at least a portion 803 of the alphanumeric input 701 transmitted to the server 111 is different from another portion of the alphanumeric input 701 that includes one or more of the keyword 373. However, the at least a portion 803 of the alphanumeric input 701 transmitted to the server 111 may include all of the alphanumeric input 701.

Furthermore, in the example embodiment, the controller 320 is configured to transmit the at least a portion 803 of the alphanumeric input 701 to the server 111 with the current location 805 and the identifier 807 of the at least one monitored application 372 at which the alphanumeric input 701 was received.

With reference to FIG. 9, the request 801 is transmitted to the server 111 via the link 104-2.

For example, with reference to both FIG. 8 and FIG. 9, the controller 320 may be further configured to transmit the alphanumeric input 701 to the server 112 (e.g. a search server), that hosts the at least one monitored application 372, to perform a search of the alphanumeric input 701. As depicted, the alphanumeric input 701 is transmitted, via the interface 324, to the server 112 using the link 104-3. For example, the alphanumeric input 701 may be transmitted to the server 112 upon actuation of an "Enter" key, a "Send" key, and the like, associated with the at least one monitored application 372 and/or at the input device 329. In embodiments where the at least one monitored application 372 comprises a messaging application and/or a telephone application, the alphanumeric input 701 may be transmitted to the server 112 in the form of a message and/or telephone call initiation data.

While not depicted in FIG. 9, the server 112 may return search results to the device 102 based on a search of the alphanumeric input 701. Alternatively, where the at least one monitored application 372 comprises a messaging application and/or a telephone application, and the server 112 may comprise a messaging server and/or a telephone server; the server 112 may transmit the alphanumeric input 701 to a further communication device in the form of a message and/or establish a telephone call between the device 102 and the further communication device based on the alphanumeric input 701 received in telephone call initiation data.

However, in other embodiments, the alphanumeric input 701 may not be transmitted to the server 112. In other words, the at least a portion 803 of the alphanumeric input 701 may be received at the at least one monitored application 372, provided to the assistance application 371, and transmitted to the server 111 with the current location 805 without the device 102 otherwise transmitting the alphanumeric input 701 to the server 112. For example, the alphanumeric input 701 may be received at the at least one monitored application 372 without actuation of an "Enter" key, a "Send" key, and the like. Hence, receiving the alphanumeric input 701 at the at least one monitored application 372 as keystrokes at the input device 329, may generally cause implementation of transmission of the request 801, and the like, regardless of whether the alphanumeric input 701 is transmitted to the server 112.

Also depicted in FIG. 9 is an implementation of the block 602 of the method 600, in which the controller 420 of the server 111 receives (e.g. using the communication interface 424), a respective location 905 of the responder augmented reality device 101. The respective location 905 of the device 101 is generally determined using the location determining device 250 at the device 101 and transmitted to the server 111, for example periodically, upon request from the server 111, and the like.

As further depicted in FIG. 9, the device 101 transmits, to the server 111, a status 915 of the device 101. The status 915 of the device 101 may be determined at the device 101 based on, for example, whether the officer 121 is logged into ("Available) or not logged into ("Unavailable") the device 101, whether the device 101 is on or off (e.g. an "on" sequence at the device 101 including transmitting a status of "Available" to the server 111, and an "off" sequence at the device 101 including transmitting a status of "Unavailable" to the server 111), and the like. In yet further embodiments, the status of the device 101 stored at the record 453 may be determined at the server 111 (e.g. the status 915 is not transmitted from the device 101 to the server 111) based on, for example, whether the server 111 has dispatched the device 101 to respond to an emergency situation, and the like (e.g. when the device 101 has not been dispatched the status is "Available" and when the device 101 has been dispatched the status is "Unavailable").

Figure 10:
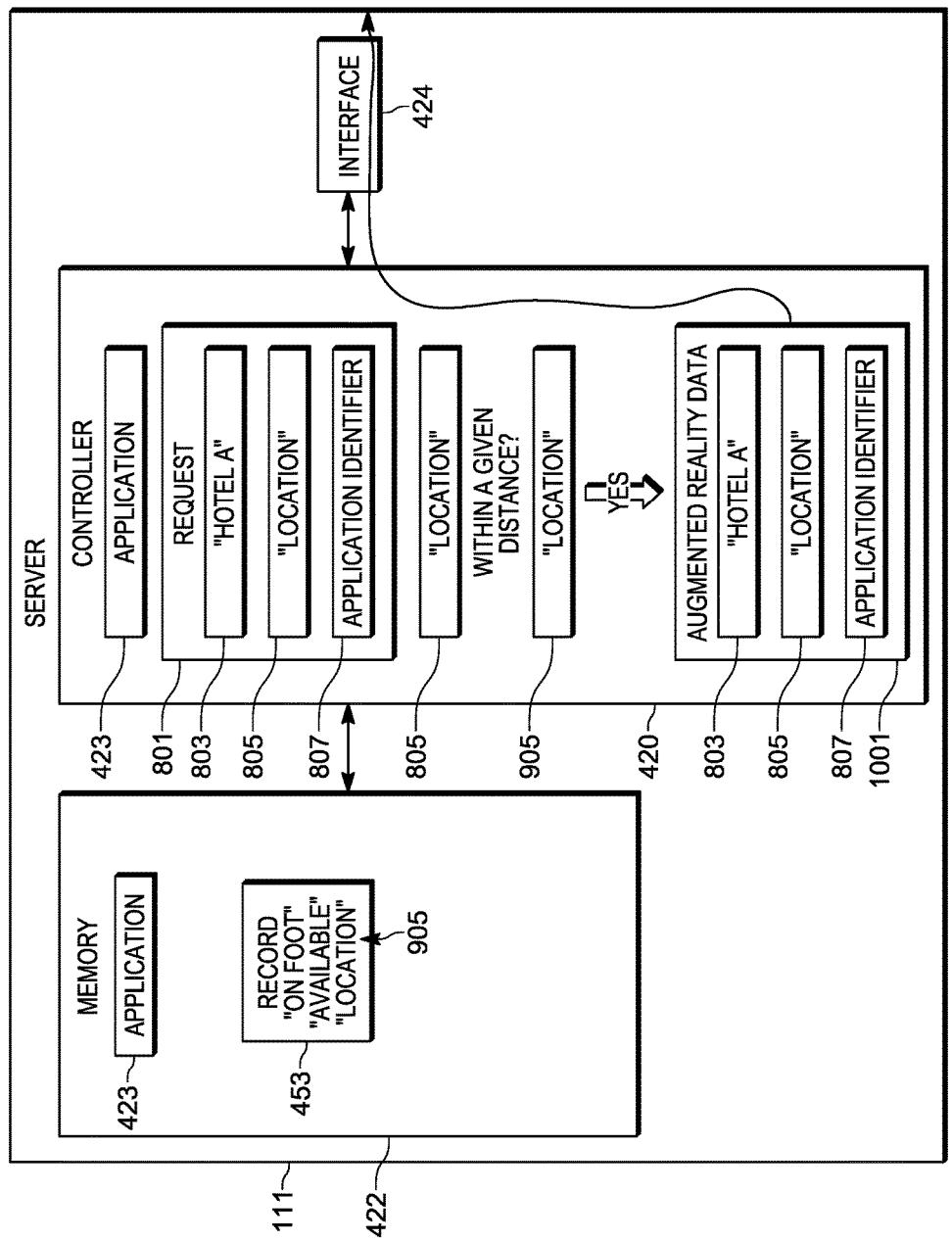
FIG. 10 depicts the public safety server generating augmented reality data based on the request for assistance when the responder augmented reality device is within a given distance of the associated location of the communication device in accordance with some embodiments.

Attention is next directed to FIG. 10 which is substantially similar to FIG. 4, with like elements having like numbers. In FIG. 10, the controller 420 of the server 111 is implementing the application 423, has received (e.g. at the block 602 of the method 600) the location 905 of the device 101, and optionally updated the record 453 to include the location 905. It is assumed in FIG. 10 that the record 453 has been further updated to include the status 915, for example when a status of the device 101 has changed from a status previously stored at the record 453.

As further depicted in FIG. 10, the controller 420 of the server 111 has received (e.g. at the block 604 of the method 600), using the communication interface 424, the request 801 for assistance that includes: the portion 803 of the alphanumeric input 701 and the associated location 805 of the device 102 from which the request 801 was received. As depicted, the request 801 for assistance further includes the identifier 807 of the at least one monitored application 372 at which the alphanumeric input 701 was received.

As further depicted in FIG. 10, the controller 420 has converted (e.g. at the block 606 of the method 600) at least a portion of the request 801 to augmented reality data 1001 which includes: the portion 803 of the alphanumeric input 701 and the associated location 805 of the device 102 and, optionally, the identifier 807.

The augmented reality data 1001 may include at least a portion of the alphanumeric input 701 and/or the entirety of the alphanumeric input 701.

In general, the augmented reality data 1001 is in a format for display at the display device 226, for example, when a view at the display device 226 includes the location 805 (and optionally, the camera 227 is facing a direction that includes the location 805).

As further depicted in FIG. 10, the controller 420 has determined (e.g. at the block 608 of the method 600) that the respective location 905 of the responder augmented reality device 101 is within a given distance of the associated location 805 of the device 102 from which the request 801 was received (e.g. a "YES" decision at the block 608 of the method 600). The given distance may be configured at the application 423 and may be determined heuristically as a distance where a first person may view a second person (e.g. a distance where the officer 121 may view the user 122), for example a value between about 10 m and about 50 m. However, the given distance may also be set by the officer 121 interacting with the device 101 (e.g. via the input device 229) to increase or decrease the given distance; in such embodiments, the given distance (and/or changes thereto) may be transmitted from the device 101 to the server 111.

As depicted in FIG. 10, the augmented reality data 1001 is generated when the respective location 905 of the responder augmented reality device 101 is within the given distance of the associated location 805 of the device 101. However, in other embodiments, for example to reduce a response time of the server 111 in transmitting the augmented reality data 1001, the augmented reality data 1001 is generated when the request 801 and the location 905 are received, and/or concurrently with determining whether the respective location 905 of the responder augmented reality device 101 is within the given distance of the associated location 805 of the device 101. In other words, the block 606 of the method 600 may occur in response to a "YES" decision at the block 608, concurrently with the block 608 being implemented, and/or prior to the block 608 being implemented.

Figure 11:
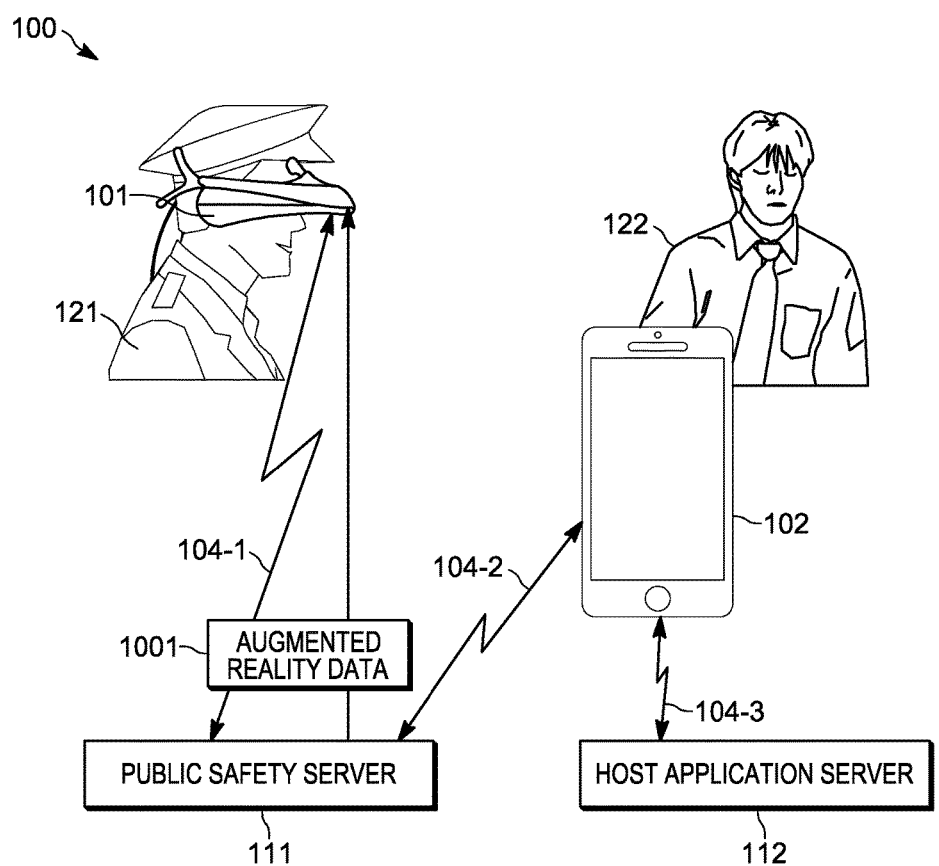
FIG. 11 depicts the public safety server automatically transmitting the augmented reality data to the responder augmented reality device in accordance with some embodiments.

With reference to both FIG. 10 and FIG. 11 (which is substantially similar to FIG. 1, with like elements having like numbers), the controller 420 transmits (e.g. when a "YES" decision occurs at the block 608 of the method 600) the augmented reality data 1001 to the responder augmented reality device 101 for display thereupon (e.g. using the interface 424).

In some embodiments, the controller 420 is further configured to determine whether to transmit the augmented reality data 1001 to the responder augmented reality device 101 based upon the status of the responder augmented reality device 101, the status indicating whether the responder augmented reality device 101 is available or unavailable. For example, the controller 420 may be further configured to: receive, using the communication interface 424, the status 915 of the responder augmented reality device 101; when the status 915 indicates that responder augmented reality device 101 is available (as depicted), transmit the augmented reality data 1001 to the responder augmented reality device 101; and when the status 915 indicates that responder augmented reality device 101 is unavailable, do not transmit the augmented reality data 1001 to the responder augmented reality device 101.

In yet further embodiments, the controller 420 may be further configured to determine whether to transmit the augmented reality data 1001 to the responder augmented reality device 101 based upon a mode of transportation of the responder augmented reality device 101, for example as stored in the record 453. For example, when the mode of transportation is a "vehicle", the augmented reality data 1001 may not be transmitted, but when the when the mode of transportation is "on-foot", "bicycle", "horse" and the like, the augmented reality data 1001 may be transmitted.

In yet further embodiments, the controller 420 may be further configured to determine whether to transmit the augmented reality data 1001 to the responder augmented reality device 101 based upon a speed of the responder augmented reality device 101, which may be transmitted to the server 111 by the device 101. For example, when the mode of transportation is a "vehicle", but the speed is above a threshold speed (e.g. 30 km/hr, however the speed may be configurable at the server 111), the augmented reality data 1001 may not be transmitted; however, when the mode of transportation is a "vehicle", but the speed is below the threshold speed, the augmented reality data 1001 may be transmitted.

Figure 12:
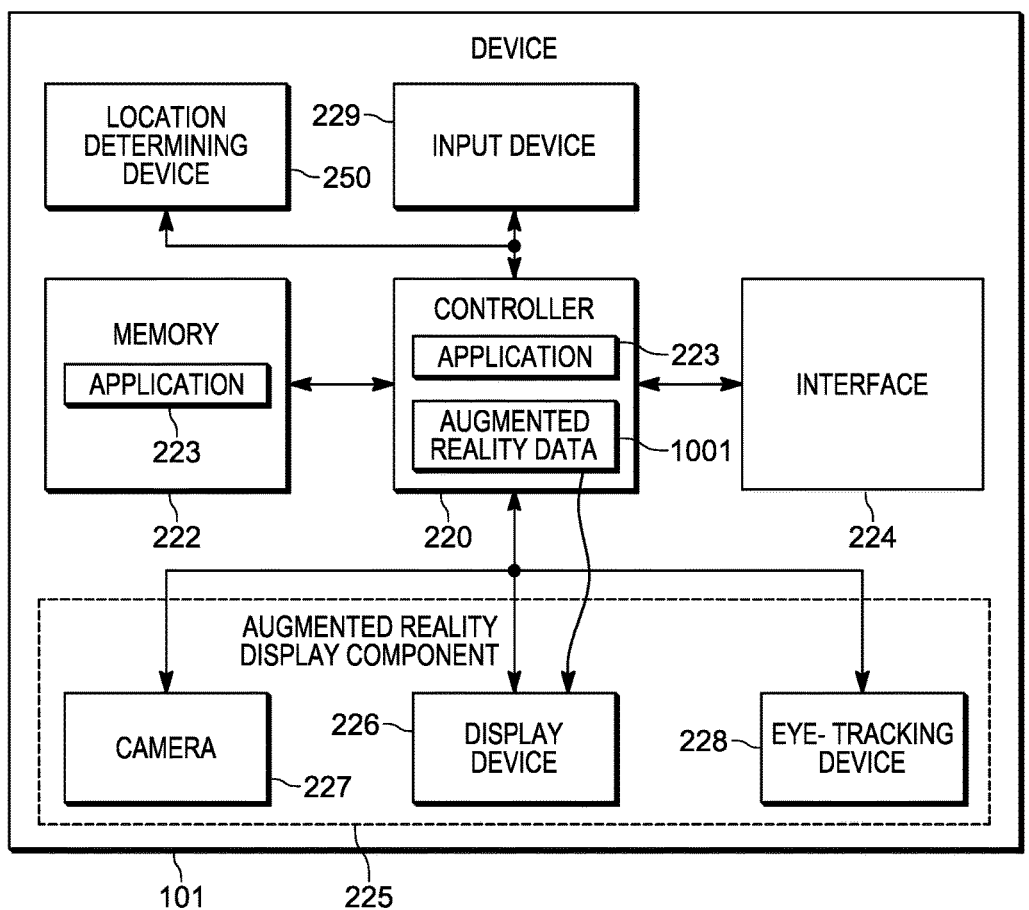
FIG. 12 depicts the responder augmented reality device of FIG. 2 controlling a display device using the augmented reality data in accordance with some embodiments.

Attention is next directed to FIG. 12 which is substantially similar to FIG. 2 with like elements having like numbers. In FIG. 12, the controller 220 has received the augmented reality data 1001 and is using the augmented reality data 1001 to control the display device 226.

Figure 13:
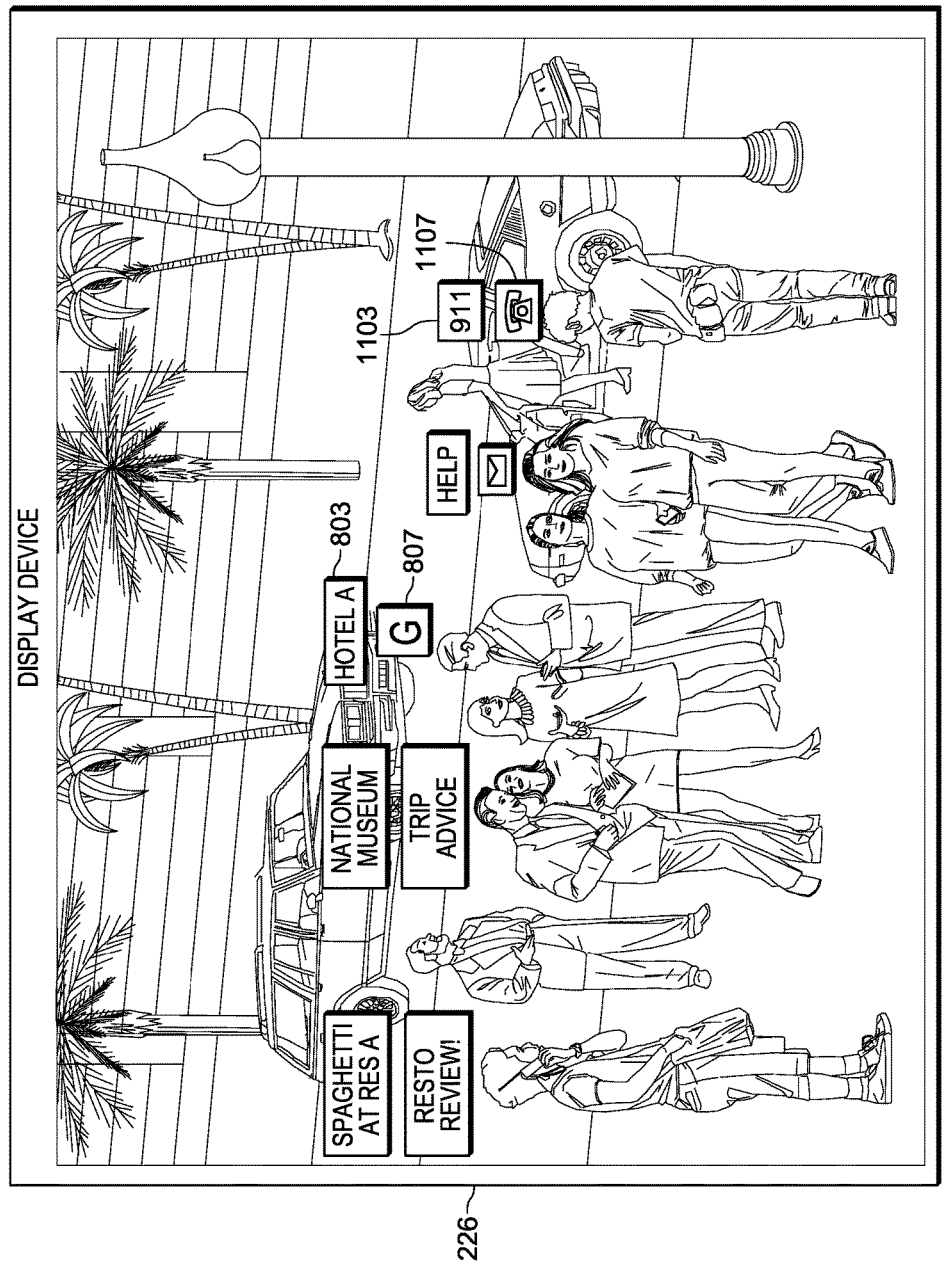
FIG. 13 depicts a view at the display device of the responder augmented reality device based on the augmented reality data received from the public safety server in accordance with some embodiments.

For example, attention is next directed to FIG. 13 which depicts a view at the display device 226 assuming that the view at the display device 226 includes the location 805 (and optionally, the camera 227 is facing a direction that includes the location 805, for example when the display device 226 is not transparent). In particular, the view at the display device 226 includes a geographic region that includes the location 805 of the device 102 (and which may be an image provided by the camera 227 and/or a view through the display device 226, e.g. when the display device 226 is transparent). As depicted, the view through the display device 226 includes the portion 803 of the alphanumeric input 701 received with the augmented reality data 1001 and optionally the identifier 807 received with the augmented reality data 1001, the portion 803 and the identifier 807 provided at a position on the display device 226 that corresponds to the location 805 received with the augmented reality data 1001. As depicted, the identifier comprises the letter "G" which may be a logo of a search application (e.g. the at least one monitored application 372). While the device 102 may not be visible in the view (e.g. a line of sight from the officer 121 to the device 102 and/or the user 122 may blocked by other people, geographic features, trees, kiosks, building and the like), the officer 121 using the device 101 may assume that the portion 803 and the identifier 807 corresponds to a location of a user and/or device requesting assistance, as described above.

Indeed, as depicted, the view through the display device 226 includes a plurality of portions of alphanumeric input received at a plurality of the devices, similar to the device 102, as well as (optionally) respective identifiers of monitored applications at which the alphanumeric input received. The officer 121 may hence triage as to which user to assist based on a heuristic determination of which the plurality of portions of alphanumeric input seem most urgent. For example, as depicted, a user has typed "911" (e.g. alphanumeric input 1103) into their device using a telephone application (as optionally indicated by a graphic identifier 1107 of a telephone), and the officer 121 may determine that such a user requires assistance more urgently than a user searching for a hotel, restaurant, tourist location, and the like.

Furthermore, the view at the display device 226 may be updated based on an eye-gaze direction of the officer 121 as determined using the eye-tracking device 228; for example, while in FIG. 13 all of the plurality of portions of alphanumeric input are depicted, in other embodiments, only those portions corresponding to an eye-gaze direction of the officer 121 are provided at the display device 226, for example so as to not overwhelm the officer 121 with information.

FIG. 13 further depicts that the method 500 may be implemented at a plurality of devices, similar to the device 102, and that the server 111 may implement the method 600 for a plurality of requests for assistance from the plurality of devices. Indeed, the server 111 may further implement the method 600 for a plurality of responder augmented reality devices similar to the device 101, assuming that there are a plurality of officers and/or responders available to provide assistance. As described above with respect to the block 609 of the method 600, when there are no officers and/or responders within a given distance of a device that is automatically requesting assistance, the server 111 may automatically dispatch an officer and/or a responder to provide assistance, for example based on keywords in a request, for example by transmitting a dispatch command to a device associated with an officer and/or a responder (which may, or may not, include a responder augmented reality device).

For example, with reference to FIG. 13, when an officer and/or a responder is not within a given distance of the device at which the alphanumeric input 1103 was received, and specifically the text "911" the server 111 may automatically dispatch an officer and/or a responder to the device. In other words, when the request includes the keyword "911", the server 111 may automatically dispatch an officer and/or a responder to the device at which the alphanumeric input 1103 was received.

In yet further embodiments, the server 111 may initiate a call (e.g. from a 911 call center, an emergency call center, and the like) to the device at which the alphanumeric input 1103 was received, assuming that the server 111 has a record of a telephone number, and the like, of such a device; indeed, in some embodiments, a request for assistance (such as the request 801) transmitted to the server 111 may include the telephone number, and the like, of the device transmitting the request.

Hence, provided herein is a system, device and method of public safety assistance detection in which an assistance application at a device monitors alphanumeric input at a monitored application at the device; and, when the alphanumeric input includes one or more keywords, at least a portion of the alphanumeric input is transmitted to a public safety server, along with a location of the device, for example in a request for assistance. The server determines whether a responder augmented reality device is within a given distance of the device from which the request was received and transmits data in the request to a responder augmented reality device is within the given distance, the data converted to augmented reality data for display at the responder augmented reality device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of at least two items X, Y, and Z (e.g., XYZ, XY, YZ, ZZ, and the like). Similar logic can be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
   a communication interface; a location determining device; an input device; a memory storing keywords; and
   a controller configured to:
      implement: an assistance application; and at least one monitored application at which alphanumeric input is received using the input device, each of the assistance application and the at least one monitored application hosted by different respective servers;
      when the alphanumeric input is received at the at least one monitored application, provide the alphanumeric input to the assistance application; and
      when the alphanumeric input is received at the assistance application includes one or more of the keywords, transmit, using the communication interface, at least a portion of the alphanumeric input to a server that hosts the assistance application, the at least a portion of the alphanumeric input transmitted with: a current location determined using the location determining device; and an identifier of the at least one monitored application at which the alphanumeric input was received.

2. The device of claim 1, wherein the controller is further configured to transmit, using the communication interface, the alphanumeric input to a search server, that hosts the at least one monitored application, to perform a search of the alphanumeric input.

3. The device of claim 1, wherein the server that hosts that the assistance application comprises a public safety server, and wherein the controller is preconfigured to communicate with the public safety server via the assistance application.

4. The device of claim 1, wherein the alphanumeric input includes keystrokes from the input device.

5. The device of claim 1, wherein the at least one monitored application includes one or more of: a browser application; a search application; a messaging application; and a telephone application.

6. The device of claim 1, wherein the alphanumeric input includes one or more of a location name and data indicative of an emergency.

7. The device of claim 1, wherein the at least a portion of the alphanumeric input transmitted to the server includes one or more of a location name and data indicative of an emergency.

8. The device of claim 1, wherein the at least a portion of the alphanumeric input transmitted to the server is different from another portion of the alphanumeric input that includes a keyword.

9. The device of claim 1, wherein the controller is further configured to turn the assistance application on and off based on input received at the input device.

10. A method comprising:
    implementing, at controller of a device: an assistance application; and at least one monitored application at which alphanumeric input is received using an input device, each of the assistance application and the at least one monitored application hosted by different respective servers;
    when the alphanumeric input is received at the at least one monitored application, providing, using the controller, the alphanumeric input to the assistance application; and
    when the alphanumeric input is received at the assistance application includes one or more keywords stored at a memory, transmitting, using a communication interface of the device, at least a portion of the alphanumeric input to a server that hosts the assistance application, the at least a portion of the alphanumeric input transmitted with: a current location determined using a location determining device; and an identifier of the at least one monitored application at which the alphanumeric input was received.

11. The method of claim 10, further comprising transmitting, using the communication interface, the alphanumeric input to a search server, that hosts the at least one monitored application, to perform a search of the alphanumeric input.

12. The method of claim 10, wherein the server that hosts that the assistance application comprises a public safety server, and wherein the controller is preconfigured to communicate with the public safety server via the assistance application.

13. The method of claim 10, wherein the alphanumeric input includes keystrokes from the input device.

14. The method of claim 10, wherein the at least one monitored application includes one or more of: a browser application; a search application; a messaging application; and a telephone application.

15. The method of claim 10, wherein the alphanumeric input includes one or more of a location name and data indicative of an emergency.

16. The method of claim 10, wherein the at least a portion of the alphanumeric input transmitted to the server includes one or more of a location name and data indicative of an emergency.

17. The method of claim 10, wherein the at least a portion of the alphanumeric input transmitted to the server is different from another portion of the alphanumeric input that includes a keyword.

18. A server comprising:
    a communication interface; and
    a controller configured to:
       receive, using the communication interface, a respective location of a responder augmented reality device;
       receive, using the communication interface, a request for assistance that includes:
    alphanumeric input and an associated location of a device from which the request was received;
       convert at least a portion of the request to augmented reality data; and
       when the respective location of the responder augmented reality device is within a given distance of the associated location of the device from which the request was received, transmit, using the communication interface, the augmented reality data to the responder augmented reality device for display thereupon.

* * * * *